Patented Mar. 21, 1950

2,501,014

UNITED STATES PATENT OFFICE 2,501,014

METHOD OF OBTAINING HIGHLY-PURIFIED STREPTOMYCIN ACID-ADDITION SALTS

Oskar Wintersteiner and Josef Fried, New Brunswick, N. J., assignors to E. R. Squibb & Sons, New York, N. Y., a corporation of New York No Drawing. Application May 1, 1946, Serial No. 666,541

4 Claims. (Cl. 260—210)

This application is a continuation-in-part of our application Serial No. 590,974, filed April 28, 1945, which has been permitted to become abandoned.

This invention relates to the potent bacteriostatic and/or bactericidal agent formed during the growth processes of the organism *Actinomyces griseus* (Schatz, Bugie, and Waksman, Proc. Soc. Exp. Biol. and Med., 1944, 55, 66), the free-base form of which is known as "streptomycin."

The term "streptomycin," as employed herein, is intended to comprehend, besides streptomycin per se, the streptomycin-like substance obtained by subjecting to extraction with an aqueous acid the solids of a culture of *Actinomyces griseus* that has produced streptomycin, which substance may in fact be streptomycin, or a form thereof (and is the subject-matter of Rake, Koerber, and Donovick application, Serial No. 586,824, filed April 5, 1945, now Patent No. 2,461,922, dated February 15, 1949).

Although the partially-purified streptomycin and acid-addition salts thereof obtained prior to this invention were exceptionally-effective chemotherapeutic (antibiotic) agents, the therapeutic utility thereof was impaired by the impurities present.

It is an object of this invention to provide highly-purified streptomycin and acid-addition salts thereof, and a method of obtaining them; and a further object is to provide pure, crystalline derivatives of streptomycin, and methods of obtaining them; and a still further object is to provide substantially-pure streptomycin and acid-addition salts, and methods of obtaining them.

[The potency unit referred to hereinafter is derived from the amount of streptomycin required to inhibit completely the multiplication of 500–1000 cells of *K. pneumoniae* growing under standardized conditions in a culture medium containing 1% tryptone; one unit being equivalent to one gamma of pure streptomycin base.]

The purification method of this invention comprises: (1) treating a primary streptomycin-containing liquid [e. g., (a) the substantially neutral culture liquid obtained by growing *Actinomyces griseus* under conditions and in a medium suitable for the production of streptomycin and removing the solids from the medium, (b) the culture liquid of enhanced potency obtained by acidification of such culture, neutralized, or (c) the liquid obtained by acid extraction of the solids separated from such culture, neutralized] with an activated charcoal; (2) eluting the charcoal with a dilute mineral acid, preferably at a slightly elevated temperature (say about 50–70° C.); (3) treating the eluate with an organic-base precipitating reagent, preferably phosphotungstic acid; and (4) decomposing the precipitate. The thus-obtained solution of partially-purified streptomycin acid-addition salt, or the partially-purified streptomycin acid-addition salt obtained therefrom by freeze-drying (i. e., freezing and subjecting to a high vacuum to sublime-out the water) may be used as a chemotherapeutic agent without further purification, or may be further purified as outlined hereinafter.

This partially-purified, water-soluble streptomycin acid-addition salt is further purified by: (1) reacting it with an organic acid (inter alia, picrolonic acid, flavianic acid, styphnic acid, and especially picric acid) which forms, with organic bases, salts that are insoluble in water and soluble in organic solvents, in a solvent for the reactants (e. g., water or alcohol); (2) dissolving the resulting organic-acid salt (e. g., picrate) or active fraction thereof in an organic solvent therefor, preferably in acetone; (3) passing the solution through a chromatographic adsorption column, preferably through a column of activated alumina; (4) eluting the streptomycin-rich sections of the chromatogram with an aqueous, water-miscible organic solvent for the streptomycin organic-acid salt, preferably with aqueous acetone [the positions of the streptomycin-rich and streptomycin-poor sections in the chromatogram may vary, being affected by small variations in the conditions of culture, for example]); (5) decomposing the streptomycin organic-acid salt with a strong mineral acid (inter alia, hydrochloric and sulfuric acids); and (6) separating the organic solvent and organic-acid reagent used from the streptomycin inorganic-acid salt formed. The freeze-dried product obtained when the streptomycin organic-acid salt has been decomposed with sulfuric acid, for example, is a highly-purified streptomycin sulfate, having a potency of about 490 units/mg.; it may be used as—or converted into streptomycin base for use as—a chemotherapeutic agent without further purification, or may be further purified as outlined hereinafter. [Alternatively, the streptomycin-rich portion of the chromatogram may be eluted with hydrochloric acid, and the organic-acid reagent used separated from the streptomycin hydrochloride formed.]

From this highly-purified, water-soluble streptomycin acid-addition salt, a pure, crystalline derivative may be obtained by reacting with an organic-base precipitating reagent of the chromium-complex type (inter alia, salts of reinecke acid and rhodanilic acid) in aqueous solution, and recovering the crystalline derivatives (which may, if desired, be recrystallized from water).

From this pure, crystalline derivative, substantially-pure streptomycin base and derivatives thereof may be obtained by: (1) decomposing the derivative with a salt of a metal forming an insoluble salt of the organic-base precipitating reagent used, preferably (in the case of the crystalline reineckate) with silver sulfate; (2) removing the precipitate; and (3) recovering the resulting substantially-pure streptomycin salt. The thus-obtained substantially-pure streptomycin salt (e. g., substantially-pure streptomycin sulfate) may be used as a chemotherapeutic agent, or may be converted into substantially-pure streptomycin base for use as a chemotherapeutic agent, or may be converted into the following substantially-pure derivatives of streptomycin, inter alia: acyl derivatives, such as the benzoyl, p-nitro-benzoyl, toluenesulfonyl, β-naphthalenesulfonyl, acetyl, and propionyl derivatives (by acylation in the conventional manner); methyl derivatives (for example, by reaction with dimethyl sulfate and dilute alkali); and ureide or urethane derivatives (for example, by reaction with phenyl isocyanate or cyanic acid).

The substantially-pure streptomycin base obtained in accordance with this invention has the empirical formula $C_{21}H_{37-39}O_{12}N_7$ (calculated from the analytical figures for the crystalline reineckates), and hence contains neither sulfur nor phosphorus. Because of its basicity, streptomycin base forms water-insoluble salts with organic-base precipitating reagents, inter alia, phosphotungstic acid, silicotungstic acid, picric acid, trinitroresorcinol, flavianic acid, mercuric chloride, reinecke salt, and ammonium rhodanilate. The chloroplatinate, hydrochloride, sulfate, and tartrate of the substantially-pure streptomycin base are soluble in water. The basic or salt-forming groups in the streptomycin base can be acylated (by the method of Schotten and Baumann) with benzoyl chloride, p-nitrobenzoyl chloride, p-toluene-sulfonyl chloride, and β-naphthalene-sulfonyl chloride, inter alia.

The following examples are illustrative of the invention:

Example 1

(a) 400 gal. of a medium containing 1.5% soybean meal, 1.0% dextrose, 0.5% meat extract, and 0.5% sodium chloride in a 1300 gal. tank is inoculated with spores of Actinomyces griseus, and the medium is incubated at 25° C. with a pressure of 10–15 lbs. (air being passed through the medium) while agitating.

After 120 hours incubation, the culture (which has a pH of 7.0 and a potency of about 120 units/ml.) is adjusted to pH 3.5 by adding 37% hydrochloric acid, and the acidified culture is agitated for another 48 hours at 5° C. (without aeration). The culture (whose potency is raised by this treatment to about 175 units/ml.) is centrifuged to obtain a supernate (I) and a sediment (II).

(b) 80 liters of the supernate I, having a potency of about 175 units/ml., is adjusted to pH 7.5 with dilute sodium hydroxide solution, and stirred with 2.8 kg. Nuchar C–190 (an activated charcoal) for 15 minutes at room temperature; and the charcoal (on which streptomycin has been selectively adsorbed) is filtered off and washed with water. (The filtrate, which contains little activity, is discarded.) The streptomycin is then eluted from the charcoal by washing with four portions of $^1/_{10}$-normal hydrochloric acid at 50° C., using successively 25, 15, 10 and 10 liters.

To the combined eluates is then added 1520 ml. of a 25% aqueous solution of phosphotungstic acid. The streptomycin phosphotungstate precipitated with the phosphotungstates of other basic substances as a fine flocculent powder is allowed to stand for 15 hours at 0° C., and then filtered off. (The filtrate, which contains 10% of the original activity, may be discarded.) The precipitate is suspended in 1500 ml. water; and (while excluding carbon dioxide) a saturated aqueous solution of $Ba(OH)_2$ is added dropwise at 20° C. with vigorous agitation until the pH (measured at regular intervals) is 7.5. The precipitate, which consists of undecomposed streptomycin phosphotungstate and barium phosphotungstate, is filtered off; and the filtrate, which contains little streptomycin, is discarded. The precipitate is resuspended in water and again treated with saturated $Ba(OH)_2$ solution in the same manner until the pH remains constant at 10.0 on agitation for 2 minutes without further addition of $Ba(OH)_2$. The precipitate (barium phosphotungstate) is filtered off; and the streptomycin-containing filtrate is neutralized with sulfuric acid to pH 6.9, filtered, and freeze-dried. To remove some water-insoluble impurities, the freeze-dried product is dissolved in a minimum amount of ice water, filtered, and again freeze-dried. The dry streptomycin sulfate thus obtained has a potency of about 75 units/mg.

(b, alternative). The streptomycin phosphotungstate precipitate is decomposed by suspending it in dilute sulfuric acid; the phosphotungstate acid formed is extracted with a mixture of equal parts amyl alcohol and ether; and the aqueous phase (sulfuric acid solution) is neutralized with barium hydroxide (and filtered) to obtain a solution of partially-purified streptomycin sulfate.

(c) 50 g. of the partially-purified streptomycin sulfate having a potency of about 75 units/mg. is dissolved in 100 ml. water, and 3750 ml. of a saturated aqueous solution of picric acid is added. After the mixture has stood for one hour at room temperature, the supernate and the oily deposit (A) are separated. (The oily deposit A contains only 15% of the total activity, but may, if desired, be further treated in the same manner as described hereinafter for deposit B.) The supernate is then maintained at 0° C. for 24 hours, and the viscous oil (B) which settles is separated from the mother liquor.

The oily picrate B is dried in vacuo, and the dried picrate is dissolved in a mixture of 500 ml. acetone and 10 ml. benzene. The resulting solution is filtered and chromatographed in a column of alumina 35 cm. long and 48 mm. in diameter, which has previously been washed with dilute sulfuric acid and reactivated by heating at 150° C. The column is then washed with 8 liters of acetone to develop the chromatogram into an intensely-yellow upper zone and a less-intensely-colored lower zone. The upper zone is divided into three equal portions; and the lowest portion is eluted with 500 ml. of a mixture of 6 parts acetone and 4 parts water. To the eluate is added 25 ml. of 1-normal sulfuric acid, and the acetone therein is removed in vacuo. Then the picric acid formed is removed by extracting it with ether in a continuous-flow liquid extractor, until the aqueous phase is nearly colorless, and the remaining aqueous solution is neutralized with barium hydroxide. On filtering off the precipitated barium sulfate and freeze-drying the filtrate, highly-purified streptomycin sulfate having a potency of about 470 units/mg. is obtained. [Similar treatment of the middle and upper portions (of the upper, intensely-yellow zone) yields streptomycin sulfate products having potencies of about 400 and 230 units/mg., respectively; and these products may be used as chemotherapeutic agents without further purification, or may be further purified by resubmitting them to the purification treatment detailed in this section of the example.]

(c, alternative) The streptomycin-rich portion of the chromatogram is eluted with 1/25-normal hydrochloric acid instead of with acetone-water mixture. The eluate is concentrated 3 or 4 times in vacuo, and the picric acid formed is removed by extracting it with ether in a continuous-flow liquid extractor, until the aqueous phase is nearly colorless. The remaining aqueous solution (of streptomycin hydrochloride in excess hydrochloric acid) is treated with finely-powdered silver oxide until all the chloride ion is removed from the solution; the precipitate is filtered off; and the filtrate is neutralized with dilute hydrochloric acid (the small amount of silver chloride formed being filtered off). The resulting solution contains highly-purified streptomycin hydrochloride, which may be recovered by freeze-drying.

(d) 190 mg. of this highly-purified streptomycin sulfate is dissolved in 18 ml. water, and 6 ml. of a 4% aqueous solution of ammonium reineckate, $NH_4[Cr(SCN)_4(NH_3)_2]$, is added. The mixture is maintained at 18° C. for 12 hours, and the resulting amorphous precipitate is filtered off. The filtrate is slowly cooled to 0° C., and the resulting crystalline precipitate is filtered off; and two recrystallizations of this fraction yield a streptomycin reineckate as fine plates having a potency of about 410 units/mg. and a decomposition point of 158–160° C. (uncorrected). An analysis of the product (after drying in vacuo at 70° C. for 2 hours) reveals 26.9% carbon, 4.31% hydrogen, 20.5% nitrogen, 8.1% chromium, and 21.6% sulfur, indicating the composition

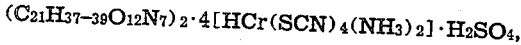

$(C_{21}H_{37-39}O_{12}N_7)_2 \cdot 4[HCr(SCN)_4(NH_3)_2] \cdot H_2SO_4$, the calculated analysis of which is 27.45% carbon, 4.29% hydrogen, 20.96% nitrogen, 8.20% chromium, and 21.43% sulfur. The air-dry crystals lose 5.8% water on drying in vacuo at 70° C. for 2 hours, indicating the crystalline reineckate to be a dihydrate.

(e) 100 mg. of the pure, crystalline streptomycin reineckate is dissolved in 50 ml. water, and to the solution is added 8 ml. of a saturated aqueous solution of silver sulfate; and after the mixture has stood for 5 hours at 0° C., the precipitate of silver reineckate is filtered off. The filtrate (containing streptomycin sulfate and excess silver sulfate) is treated with a 2% aqueous solution of barium chloride until all the silver is precipitated as silver chloride; the precipitate is filtered off; and the filtrate is freeze-dried. The substantially-pure streptomycin sulfate thus obtained may contain a small amount of inorganic impurity derived from the reineckate ion. It has a potency of about 890 units/mg.

The substantially-pure streptomycin sulfate may be converted into substantially-pure streptomycin base by addition of an equivalent amount of barium hydroxide to an aqueous solution of the streptomycin sulfate, filtering off the precipitated barium sulfate, and freeze-drying the filtrate.

The substantially-pure streptomycin base or sulfate may be converted into substantially-pure salts other than the sulfate. Thus, substantially-pure streptomycin tartrate may be obtained by adding one equivalent of tartaric acid to the substantially-pure streptomycin base in aqueous solution, and freeze-drying the resulting solution; and substantially-pure streptomycin hydrochloride may be obtained by treating the substantially-pure streptomycin sulfate with one equivalent of barium chloride, and filtering off the precipitated barium sulfate.

The substantially-pure streptomycin sulfate (or the substantially-pure free base) may be readily converted into substantially-pure acyl derivatives of streptomycin, e. g., by dissolving the sulfate and potassium bicarbonate in water, and adding benzoyl chloride, or by reacting the sulfate and benzoyl chloride in anhydrous pyridine. Other acylation products may be obtained analogously, using the corresponding acyl halides (e. g., toluenesulfonyl chloride or acetyl chloride) in place of benzoyl chloride.

*Example 2*

(a) The sediment II (mycelium, spores, and other solids in the medium) described in section (a) of Example 1 is washed twice with distilled water by centrifugation; the washed solids are extracted with N/10 hydrochloric acid (which has been adjusted to pH 2.0 with sodium hydroxide) by shaking the mixture for 16 hours at room temperature (24° C.); and the extract is separated by centrifugation. The extraction recovers about 20 units of streptomycin activity per mg. of the dry solids (dried at 100° C.).

(b) 1400 ml. of the extract (having a potency of about 220 units/ml.) is adjusted to pH 7.5 with dilute sodium hydroxide solution, and stirred with 50 g. Nuchar C–190 (an activated charcoal) for 15 minutes at room temperature; and the charcoal (on which streptomycin has been selectively adsorbed) is filtered off and washed with water. (The filtrate, which contains little activity, is discarded.) The streptomycin is then eluted from the charcoal by washing with four portions of 1/10-normal hydrochloric acid at 70° C., using a 400 cc. portion for the first elution, and 200 cc. portions for the subsequent elutions.

To the combined eluates is then added 40 ml. of a 25% aqueous solution of phosphotungstic acid; and the streptomycin in phosphotungstate precipitated with phosphotungstates of other basic substances as a fine flocculent powder is allowed to stand for 4 hours at 0° C., and then filtered off. (The filtrate, which contains little activity, is discarded.) The precipitate is suspended in 50 ml. water; and a saturated aqueous solution of $Ba(OH)_2$ is added dropwise at 20° C. with vigorous agitation until the pH (measured at regular intervals) remains constant at 10.0 on agitation for 2 minutes without further addition of barium hydroxide. The barium phosphotungstate formed is filtered off; and the streptomycin-containing filtrate is neutralized with dilute sulfuric acid to pH 6.9, filtered, and freeze-dried. To remove some water-insoluble impurities, the freeze-dried product is dissolved in a small amount of ice water, filtered, and again freeze-dried. The dry streptomycin sulfate thus obtained has a potency of about 345 units/mg. [Alternatively, the streptomycin phosphotungstate precipitate may be decomposed as described in section (b, alternative) of Example 1.]

(c) 350 mg. of this partially-purified streptomycin sulfate is dissolved in 5 ml. water, and 30 ml. of a saturated aqueous solution of picric acid is added. The semisolid picrate precipitated is separated from the aqueous solution by decantation; and the aqueous solution is concentrated in vacuo to half its volume, and left at 0° C. for 15 hours. The resulting oily picrate is then combined with the semisolid picrate, and dried in vacuo; and the dried (combined) picrate is dissolved in 20 ml. acetone.

The resulting acetone solution is chromatographed on a column of alumina 20 cm. long and 17 mm. in diameter, which has previously been washed with dilute sulfuric acid and reactivated by heating at 150° C. The column is then washed with 1 liter of acetone to develop the chromatogram into an intensely-yellow upper zone and a less-intensely-colored lower zone. The upper zone is divided into three equal portions; and the middle portion is eluted with a mixture of 6 parts acetone and 4 parts water until the effluent liquid is almost colorless. To the eluate is added 2 ml. of 1-normal sulfuric acid, and the acetone therein is removed in vacuo. Then the picric acid formed is removed by extracting it with ether in a continuous-flow liquid extractor, until the aqueous phase is nearly colorless, and the remaining aqueous solution is neutralized with barium hydroxide. On filtering off the precipitated barium sulfate and freeze-drying the filtrate, highly-purified streptomycin sulfate having a potency of about 490 units/mg. is obtained. [Similar treatment of the upper and lower portions (of the upper, intensely-yellow zone) yields streptomycin sulfate products having potencies of about 300 and about 270 units/mg., respectively; and these products may be used as chemotherapeutic agents without further purification, or may be further purified by resubmitting them to the purification treatment detailed in this section of the example.]

[Alternatively, the streptomycin-rich portion of the chromatogram may be eluted as described in section (c, alternative) of Example 1.]

From this highly-purified streptomycin sulfate, a crystalline reineckate may be obtained in the manner described in section (d) of Example 1; the pure crystalline reineckate obtained may be converted into substantially-pure streptomycin sulfate in the manner described in section (e) of Example 1; and the substantially-pure streptomycin base, other substantially-pure streptomycin salts, and substantially-pure acyl derivatives of streptomycin may be obtained as described hereinbefore.

The supernate I treated in sections (b) et seq. of Example 1 and the extract treated in sections (b) et seq. of Example 2 may be replaced by primary streptomycin-containing liquids of comparable potency obtained without acid extraction.

*Example 3*

A freshly-prepared solution of 300 mg. ammonium reineckate in 16 ml. water is added to a solution of 230 mg. highly-purified streptomycin sulfate (having a potency of 600 units/mg.) in 5 ml. water, both solutions being warmed to 40° C. before mixing. [Such highly-purified streptomycin sulfate is obtainable from a primary streptomycin-containing liquid by the procedure described in sections (b) and (c) of Example 1.] A small amount of an amorphous precipitate forms, and is removed by filtration; and the filtrate is allowed to cool very slowly to about 20° C. The resulting crystalline deposit (A) is collected by filtration, and the filtrate is cooled slowly to 4° C., yielding an additional crop of crystals (B). On recrystallization (of A and B combined) from warm water (not above 40° C.), the product is obtained as very thin, 1–2 mm. long plates having a potency of about 400 units/mg.

An analysis of the product (after drying in vacuo at 70° C. for 2 hours) reveals 27.06% carbon, 4.50% hydrogen, 20.8% nitrogen, 21.2% total sulfur, 3.54% $SO_4$, and 8.20% chromium, which is in accord with the formula $$(C_{21}H_{37-39}O_{12}N_7)_2 \cdot 4[HCr(SCN)_4(NH_3)_2] \cdot H_2SO_4,$$

representing a double salt of streptomycin base with two molecules reinecke acid and one equivalent of sulfuric acid.

*Example 4*

Using an aqueous solution of highly-purified streptomycin hydrochloride (tri-hydrochloride), obtainable as described in section (c, alternative) of Example 1, in place of the aqueous solution of streptomycin sulfate in the procedure of Example 3, a streptomycin reineckate is obtained as aggregates of small, needle-shaped crystals.

An analysis of the product (after drying in vacuo at 70° C. for 2 hours) reveals it to be free of chloride ion, and to have an elementary composition substantially in accord with the formula for streptomycin tri-reineckate, $$C_{21}H_{37-39}O_{12}N_7 \cdot 3[HCr(SCN)_4(NH_3)_2].$$

Found: C, 26.13%; H, 4.28%; N, 22.0%; S, 24.8%; and Cr, 9.38%.

The streptomycin reineckates obtained as described in Examples 3 and 4 may be further treated as described in section (e) of Example 1 to obtain substantially-pure streptomycin sulfate, or the substantially-pure base, substantially-pure salts other than the sulfate, or substantially-pure derivatives of streptomycin.

The invention may be variously otherwise embodied within the scope of the appended claims.

We claim:

1. The method which comprises reacting a partially-purified, water-soluble streptomycin acid-addition salt with picric acid in aqueous solution, dissolving the resulting picrate in an organic solvent therefor, passing the solution through a chromatographic adsorption column, eluting the streptomycin-rich sections of the chromatogram with an aqueous, water-miscible organic solvent for streptomycin picrate, decomposing the eluted picrate with a strong mineral acid, and separating the organic solvent and picric acid from the streptomycin salt formed.

2. The method which comprises reacting a partially-purified, water-soluble streptomycin acid-addition salt with picric acid in aqueous solution, dissolving the resulting picrate in an organic solvent therefor, passing the solution through a chromatographic adsorption column, eluting the streptomycin-rich sections of the chromatogram with aqueous acetone, decomposing the eluted picrate with a strong mineral acid, and separating the organic solvent and picric acid from the streptomycin salt formed.

3. The method which comprises reacting a partially-purified, water-soluble streptomycin acid-addition salt with picric acid in aqueous solution, dissolving the resulting picrate in an organic solvent therefor, passing the solution through a chromatographic adsorption column, eluting the streptomycin-rich sections of the chromatogram with an aqueous, water-miscible organic solvent for streptomycin picrate, decomposing the picrate with sulfuric acid, and separating the organic solvent and picric acid from the streptomycin salt formed.

4. The method of obtaining a substantially-pure streptomycin acid-addition salt which comprises decomposing a crystalline streptomycin reineckate with a water-soluble salt of a metal forming an insoluble reineckate, removing the precipitate, and recovering the resulting substantially-pure streptomycin salt.

OSKAR WINTERSTEINER.
JOSEF FRIED.

REFERENCES CITED

The following references are of record in the file of this patent:

UNITED STATES PATENTS

| Number | Name | Date |
|---|---|---|
| 2,035,583 | Bailey | Mar. 31, 1936 |
| 2,288,281 | Huijser et al. | June 30, 1942 |
| 2,378,876 | Waksman | June 19, 1945 |

OTHER REFERENCES

Journal of Bacteriology, vol. 46, pp. 299–310 (1943).

Proc. Soc. Expt'l. Biol. Med., vol. 49, pp. 207–210 (1942).

Proc. Soc. Expt'l. Biol. Med., vol. 55, pp. 66–69 (1944).

Lancet: Aug. 16, 1941; pp. 117–179.

Manuf. Chemist, Aug. 1943; pp. 251–254.

Brit. J. of Expt'l. Path., June 1942; pp. 103–107

Shriner and Fuson: "Identification of Organic Compounds" (2nd ed.); pp. 144, 145, 148–150.

Trier-Winterstein: "Die Alkaloide" (2nd ed., 1931) pages 965, 966 and 968.

Hackh: "Chemical Dictionary" (2nd ed., 1937) page 804.